(12) United States Patent
Arditty et al.

(10) Patent No.: US 11,079,552 B2
(45) Date of Patent: Aug. 3, 2021

(54) OPTICAL CONNECTOR, OPTICAL CONNECTION ASSEMBLY, ELECTRICAL CONNECTOR AND CONNECTION SYSTEM COMPRISING SUCH AN ELECTRICAL CONNECTOR

(71) Applicant: IXBLUE, Saint-Germain-en-Laye (FR)

(72) Inventors: Hervé Arditty, Saint-Germain-en-Laye (FR); Sébastien Grall, Saint-Germain-en-Laye (FR); Jonathan Laporte, Saint-Germain-en-Laye (FR); Christian Giroussens, Saint-Germain-en-Laye (FR); Gildas Touin, Saint-Germain-en-Laye (FR); Frédéric Mosca, Saint-Germain-en-Laye (FR); Eric Delort, Saint-Germain-en-Laye (FR); Carole Chaize, Saint-Germain-en-Laye (FR)

(73) Assignee: IXBLUE, Saint-Germain-en-Laye (FR)

( * ) Notice: Subject to any disclaimer, the term of this patent is extended or adjusted under 35 U.S.C. 154(b) by 0 days.

(21) Appl. No.: 16/770,418

(22) PCT Filed: Dec. 5, 2018

(86) PCT No.: PCT/FR2018/053120
§ 371 (c)(1),
(2) Date: Jun. 5, 2020

(87) PCT Pub. No.: WO2019/110931
PCT Pub. Date: Jun. 13, 2019

(65) Prior Publication Data
US 2020/0386948 A1 Dec. 10, 2020

(30) Foreign Application Priority Data

Dec. 5, 2017 (FR) ........................ 1761664

(51) Int. Cl.
*G02B 6/36* (2006.01)
*G02B 6/38* (2006.01)
*G02B 6/32* (2006.01)

(52) U.S. Cl.
CPC ............ *G02B 6/3604* (2013.01); *G02B 6/32* (2013.01); *G02B 6/3816* (2013.01);
(Continued)

(58) Field of Classification Search
None
See application file for complete search history.

(56) References Cited

U.S. PATENT DOCUMENTS 4,239,330 A * 12/1980 Ashkin ................ G02B 6/3504
385/21
5,039,193 A * 8/1991 Snow ..................... G02B 6/327
385/25

(Continued)

FOREIGN PATENT DOCUMENTS

| CA | 1239822 A | 8/1988 |
| EP | 1341013 A1 | 9/2003 |
| EP | 2879242 A1 | 6/2015 |

OTHER PUBLICATIONS

International Search Report (ISR), dated Mar. 21, 2019, from corresponding international application No. PCT/FR2018/053120.

*Primary Examiner* — Michael Stahl
(74) *Attorney, Agent, or Firm* — Nixon & Vanderhye

(57) ABSTRACT

An optical connector (20) includes a plurality of collimation elements (23a, 23b) which are associated with a plurality of optical fibres (21a, 21b), respectively, and which are carried by a support (24). The support is mounted for rotation in a bearing (27) about a rotation axis (z), the collimation elements (23a) are arranged in the support so as to be equidistant from this rotation axis, and the support has at least one member for angular positioning (28) about the axis. The (Continued)

invention also relates to an optical connection assembly (10) including a first such optical connector and a second optical connector (20') which is configured to be nested coaxially with the first one. An electrical connector may be provided with such an optical connector, and a connection system may be provided with such an electrical connector.

15 Claims, 4 Drawing Sheets

(52) U.S. Cl.
CPC ......... *G02B 6/3831* (2013.01); *G02B 6/3885* (2013.01); *G02B 6/3853* (2013.01)

(56) References Cited

U.S. PATENT DOCUMENTS

| | | | |
|---|---|---|---|
| 6,625,376 B2* | 9/2003 | Werkheiser | G02B 6/3803 385/139 |
| 9,291,777 B2 | 3/2016 | Poisel et al. | |
| 2003/0210859 A1 | 11/2003 | Mercey et al. | |
| 2005/0036735 A1* | 2/2005 | Oosterhuis | G02B 6/4428 385/26 |
| 2012/0020618 A1* | 1/2012 | Erdman | G02B 6/3851 385/33 |
| 2012/0155807 A1* | 6/2012 | Knapp | G02B 6/3853 385/61 |
| 2014/0270647 A1* | 9/2014 | Wild | G02B 6/32 385/74 |
| 2015/0316726 A1 | 11/2015 | Poisel et al. | |
| 2017/0062978 A1* | 3/2017 | Seido | H01R 13/62922 |
| 2018/0013227 A1 | 1/2018 | Arditty et al. | |

\* cited by examiner

OPTICAL CONNECTOR, OPTICAL CONNECTION ASSEMBLY, ELECTRICAL CONNECTOR AND CONNECTION SYSTEM COMPRISING SUCH AN ELECTRICAL CONNECTOR

TECHNICAL FIELD TO WHICH THE INVENTION RELATES

The present invention generally relates to the connection of two optical fibre assemblies at an optical connector.

It more particularly relates to an optical connector, an optical connection assembly, an electrical connector and a connection system comprising such an electrical connector.

The present invention finds in particular application in the field of the connection of underwater cables intended to transport the electricity produced by hydrokinetic turbines.

TECHNOLOGICAL BACK-GROUND

Underwater connectors are known, which are connectable under water, such feature being sometimes called "wet-mate". Such connectors can allow the establishment of an optical connection, typically intended for the transportation of data by means of optical fibres, generally in addition to an electrical connection within the framework of electric power transmission.

In the known devices, the coupling of two complementary connectors requires an accurate alignment of one connector with respect to the other along a horizontal axis (particular alignment important to ensure the optical connection) and the application of opposite horizontal forces for the connection of the two connectors.

Such a design involves the use of alignment mechanisms with 5 degrees of freedom in the case of coaxial connectors and with 6 degrees of freedom in the case of pin connectors. Other mechanisms must moreover be provided for the application of the horizontal connection forces.

That way, the known connectors are complex and the establishment of a connection by the coupling of two connectors is a tricky procedure.

Such solutions can hence not suit when the time available to perform the connection is limited, as is the case for example for the connection of underwater cables intended to transport the electricity produced by hydrokinetic turbines. Indeed, such installations are located in places where the sea current is strong and where the favourable period for a connection (generally during the slack) is hence of short duration.

OBJECT OF THE INVENTION

In order to remedy the above-mentioned drawback of the state of the art, the present invention proposes an optical connector comprising a plurality of collimation elements associated with a plurality of optical fibres, respectively, and carried by a support, wherein the support is mounted for rotation in a bearing about a rotation axis, and wherein the collimation elements are arranged in the support so as to be equidistant from this rotation axis, the support having angular positioning members about said axis.

As the collimation elements are equidistant from the above-mentioned axis, adjusting the position of each of these collimation elements, in order to optically couple these optical fibres to other optical fibres, amounts to place the support in a given angular position about this axis.

When the optical connector is moved closer to another optical connector, under the effect of the positioning members, and thanks to the rotatable mounting that allows this movement, the support rotates in the bearing and adopts this given angular position.

The structure of the optical connector according to the invention hence significantly facilitates the operations required for optically connecting two optical fibre assemblies to each other.

This structure makes it possible in particular to free from complex, controllable positioning systems with several degrees of freedom.

The optical connector according to the invention hence particularly suits to the installation of such an optical connection under water, in particular in a zone in which the sea current is strong, because it makes this installation easy, fast and reliable.

Other non-limitative and advantageous features of the optical connector according to the invention are the following:
- the optical connector further comprises an additional collimation element located at the rotation axis;
- one at least of the angular positioning members is a finger protruding from said part;
- the support has a plurality of positioning fingers;
- the free end of the finger is bevelled;
- the support has a planar surface from which extends one at least of the angular positioning members, this surface being perpendicular to the direction of extension of said positioning member.

The invention also provides an optical connection assembly comprising a first optical connector, as described hereinabove, and a second optical connector comprising a base carrying optical elements such as collimation elements and having complementary angular positioning members, each adapted to cooperate with one of the angular positioning members of the first optical connector to fix the relative angular position of the support with respect to the base.

Each complementary angular positioning member can in particular be a shape, of the second optical connector base, complementary of one of the angular positioning members of the first optical connector.

It can be provided, in particular, that the angular positioning members of the first optical connector, or that the complementary angular positioning members of the second optical connector, are made in the form of recesses comprising a guiding portion flared on the side of the recess opening, the openings of said recesses being adjacent to each other. The openings of said recesses can be distributed over the whole circumference of the support, or of the base.

The optical elements of the second optical connector being collimation elements, it can also be provided that said angular position of the support with respect to the base, fixed by said positioning members, is a coupling angular position for which a part at least of the collimation elements of the first optical connector is located facing collimation elements of the second optical connector.

The optical connection assembly can have several distinct coupling angular positions. The angular positioning members and the complementary angular positioning members are then arranged so as to fix the relative angular position of the support with respect to the base, indifferently in either one of said coupling angular positions, each coupling angular position being such that, in this position, a part at least of the collimation elements of the first optical connector is located facing collimation elements of the second optical connector.

It can be provided that any two of said coupling angular positions, nearby to each other, are separated by a same given angular spacing, whatever is the couple of nearby coupling angular positions considered.

The number of collimation elements of the first optical connector that are equidistant from the rotation axis can in particular be a multiple of the number of coupling angular positions of the optical connection assembly.

It can also be provided that one at least of said complementary angular positioning members is a recess designed to receive the above-mentioned finger.

The base of the second optical connector can further comprise a planar face designed to cooperate with said surface perpendicular to direction of extension of the angular positioning member, so as to form an axial stop.

An electrical connector is also provided, which comprises a cover, at least one electrically conductive track, and an optical connector such as the first optical connector described hereinabove.

In such an electrical connector, the bearing of the optical connector can in particular be integral with the cover, the electrically conductive track surrounding the rotation axis defined by this bearing.

The invention also provides a connection system (underwater) comprising a first electrical connector, as shown hereinabove, as well as a second electrical connector comprising a base, at least one electrically conductive track, as well as another optical connector that comprises a base carrying optical elements and that has complementary angular positioning members, each adapted to cooperate with one of the angular positioning members of the optical connector of the first electrical connector to fix the relative angular position of the support with respect to the base.

DETAILED DESCRIPTION OF AN EXEMPLARY EMBODIMENT

The following description in relation with the appended drawings, given by way of non-limitative examples, will allow a good understanding of what the invention consists of and of how it can be implemented.

In the appended drawings:

FIG. 1 schematically shows a side and cross-sectional view of an underwater connection system, including an optical connection assembly implementing the teachings of the invention;

FIG. 2 schematically shows a more detailed perspective view of the optical connection assembly of FIG. 1;

Figure 1:
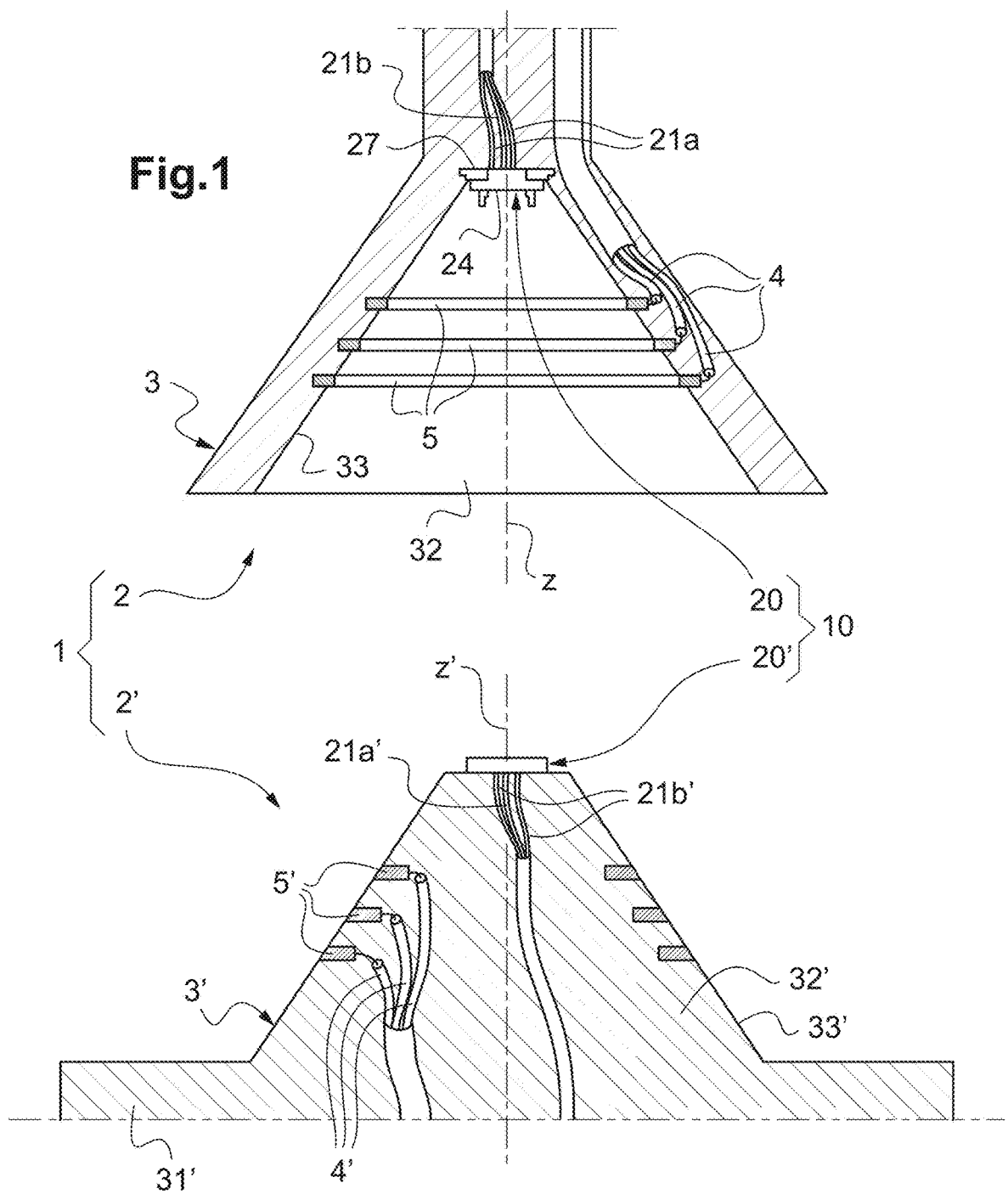
Figure 5:
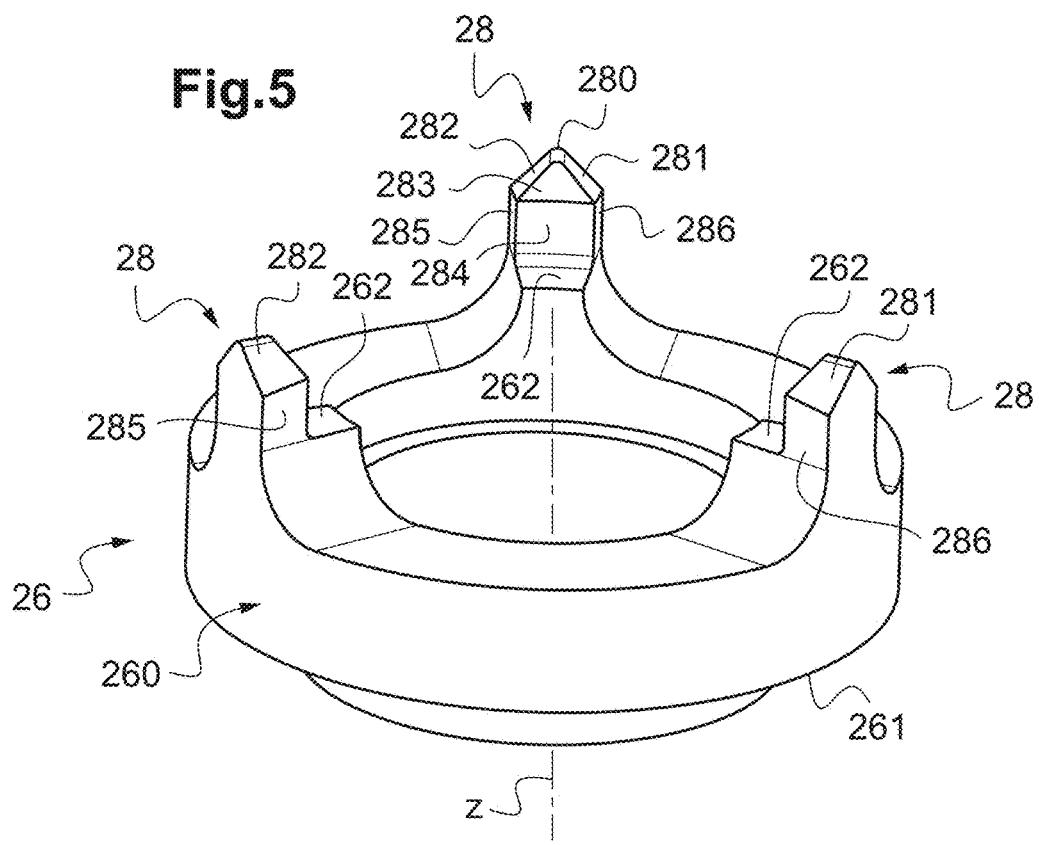
Figure 6:
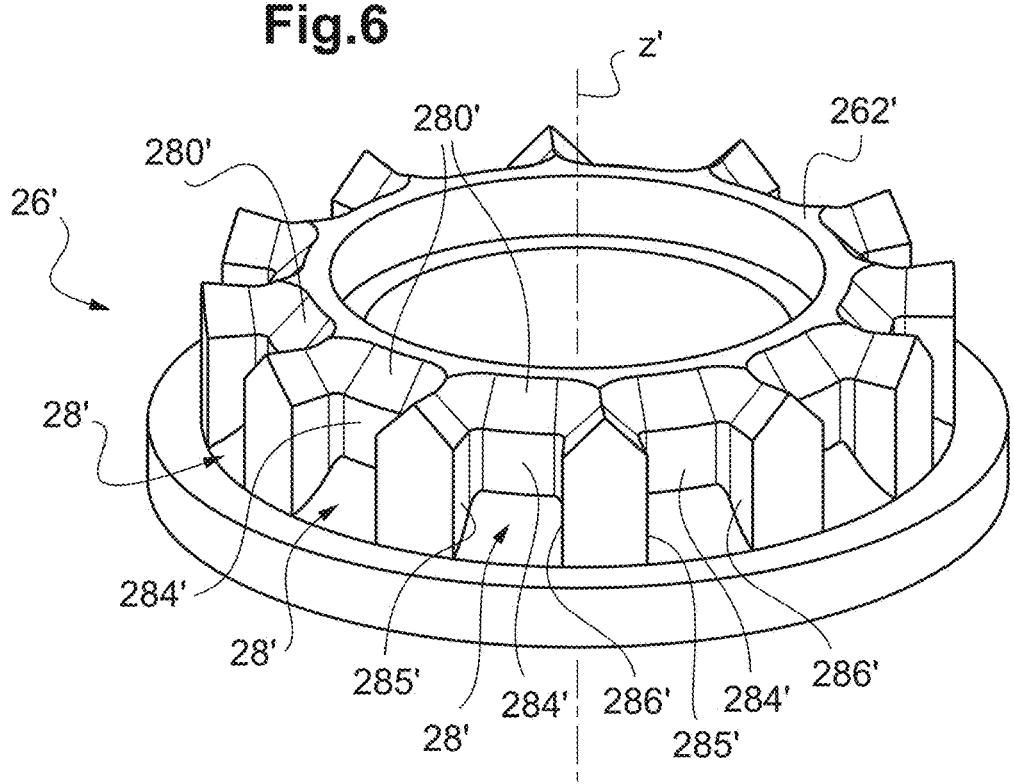

FIG. 5 schematically shows a perspective view of a guiding part of a first optical connector of the optical connection assembly of FIG. 1; and FIG. 6 schematically shows a perspective view of a guiding part of a second optical connector of the optical connection assembly of FIG. 1.

FIG. 1 schematically shows the main elements of an underwater connection system 1 that comprises a first, upper, connection element 2, and a second, lower, connection element 2', separable from each other (in FIG. 1, these two connection elements 2 and 2' are shown separated from each other).

The second connection element 2' is intended to rest on a seabed, and to receive the first connection element 2 to establish between each other an optical connection as well as, here, an electrical connection.

This optical connection is made by means of an optical connection assembly 10, which comprises a first optical connector 20 and a second optical connector 20', able to fit together, mounted on the first connection element 2 and on the second connection element 2', respectively.

The first optical connector 20 and the second optical connector 20' each have a rotational symmetry axis z, z', and are intended to coaxially fit together.

The just-presented underwater connection system 1 will be firstly described as a whole, and the optical connection assembly 10 which it is equipped with will then be described in more detail.

The second connection element 2' of the underwater connection system 1 comprises a base 3' formed of a pedestal 31' (partially shown), intended to rest on the seabed and from which rises a generally truncated protruding portion 32' intended to receive the first connection element 2. The diameter of this protruding portion 32' is smaller at the apex than at the pedestal 31'.

The second optical connector 20' is mounted at the apex of this protruding portion 32', coaxially, i.e. so that the rotational symmetry axis z' of the second optical connector coincides with the axis defined by the protruding portion 32' (axis of the truncated cone formed by this protruding portion).

The second connection element 2' houses an optical fibre assembly 21' (hereinafter called second optical fibre assembly), connected at their ends to the second optical connector 20'.

The second connector element 2' also comprises several annular metal connection tracks 5', of same axis as said protruding portion 32'. Each annular connection track 5 flushes with a truncated lateral surface 33' of the protruding portion 32'. The annular connection tracks 5' are arranged remote from each other, along the axis of the protruding portion 32'.

The second connection element 2' moreover houses an electrical connector assembly 4' (hereinafter called second electrical connector assembly), each of which is electrically connected to one of the connection tracks 5'.

The first connection element 2 of the underwater connection system 1 comprises a cover 3 (partially shown) that, just like a cap, delimits a housing 32 complementary of the protruding portion 32' of the base 3'. This housing 32 is more precisely delimited by a generally truncated inner surface 33 of the cover.

The first optical connector 20 is mounted at the bottom of the housing 32, and coaxially with the latter. The first connection element 2 moreover houses a first optical fibre assembly 21a, 21b, connected at their ends to the first optical connector 20.

The first connection element 2 also comprises annular metal connection tracks 5, of same axis as the housing 32. With respect to the inner surface 33 delimiting this housing, each annular connection track 5 slightly protrudes towards the inside of the housing 32 (i.e. towards the rotational symmetry axis of the housing).

Each of the connection tracks 5 of the cover is associated with a connection track 5' of the base 3'. Thus, the position of each connection track 5 of the cover 3 along the axis of the housing 32 corresponds (is identical) to the position of the connection track 5' associated with the base 3', along the axis of the protruding portion 32' of this base.

The first connection element 2 houses a first electrical connector assembly 4, each of which is electrically connected to one of the connection tracks 5.

To connect the first and second optical fibre assemblies 21a, 21b, 21a', 21b', as well as the first and second electrical conductor assemblies 4, 4', the first connection element 2 is deposited on the second connection element 2'. Thanks to their complementary shapes, these two connection elements 2, 2' then fit together.

The truncated shape of the housing 32 of the cover 3, and of the protruding portion 32' of the base 3', allows a progressive guiding of the two connection elements with respect to each other, to finally end up in a coaxial fitting, and that without using external positioning systems with several degrees of freedom.

During the fitting of the first and second connection elements 2, 2', the first and second optical connectors 20, 20' are also progressively moved closer to each other to be coaxially fitted together, due to their substantially coaxial arrangement in the connection elements 2 and 2'. As will be explained in detail hereinafter, the fitting of the first and second optical connectors 20, 20' allows the optical coupling of the first and second optical fibre assemblies 21a, 21b, 21a', 21b'.

Moreover, during the fitting of the first connection element 2 together with the second connection element 2', each connection track 5 of this first element comes into contact with the corresponding connection track 5' of the second connection element 2', hence establishing the electrical connection of the first electrical conductor assembly 4 with the second electrical connector assembly 4'.

The underwater connection system 1 hence allows, by depositing the first connection assembly 2 onto the second connection assembly 2', establishing an optical and electrical connection. This operation can be made rapidly, without high-precision external positioning systems, and even if the connection system is undergone to these external mechanical stresses caused in particular by sea currents present in the zone in which the connection system is implemented.

The optical connection assembly 10 of the just-presented underwater connection system 1 will now be described in more detail, with reference to FIGS. 2 to 6.

As can be seen in these Figures, the first and second optical connectors 20, 20' of this optical connection assembly 10 have comparable structures: they both have a generally cylindrical outer shape (centred to their respective symmetry axes z, z'—FIGS. 2, 5 and 6), and both comprise, in particular:
- a plurality of collimation elements 23a, 23b, 23a', 23b',
- a support 24, or a base 24', to which the collimation elements are fastened, and
- a protection window 29, 29' for protecting the collimation elements.

The first and second optical connectors 20, 20' are herein mainly different from each other in that:
- one of these connectors comprises one or several male angular positioning members, such as protruding teeth of fingers 28, whereas the other comprises one or several corresponding female positioning members, such as recesses 28', each intended to receive one of the male angular positioning members, and in that
- the first optical connector 20 further comprises a bearing 27, the other elements of the support 24 being rotatable with respect to this bearing 27, about a rotation axis z.

Each angular positioning member 28 of the first optical connector 20 is adapted to impose a given angular position to the support 24 (and this is the same for the complementary, female, angular positioning members of the base). In other words, this member is adapted, when it cooperates with a complementary member such as the recess 28', to prevent a rotation of the support 24 about the rotation axis z and to impose a given angular position (about the axis z) to this support. It is hence a positioning member, and not a rotation guiding member such as a roll bearing.

This corresponding rotation axis z here coincides with the rotational symmetry axis of the first optical connector 20 mentioned hereinabove. The first optical connector 20 is intended to be fastened to the cover 3 by this bearing 27.

The collimation elements 23a, 23b of the first optical connector 20 are associated with the optical fibres 21a, 21b, respectively, of the first optical fibre assembly, and comparably, the collimation elements 23a', 23b' of the second optical connector 20' are associated with the optical fibres 21a', 21b', respectively, of the second optical fibre assembly.

As already indicated, the first and second optical connectors 20 and 20' of this connection assembly are intended to coaxially fit together.

For that purpose, the support 24 and the base 24' comprise guiding means, so as, during this fitting, to be progressively aligned with each other, and to further take, relative to each other, a given angular position in which the collimation elements 23a, 23b of the first optical connector 20 are located opposite those 23a', 23b' of the second optical connector 20'.

The collimation elements 23a, 23b, 23a', 23b', and the arrangements thereof in the first and second optical connectors 20, 20', will be firstly described. The above-mentioned guiding and positioning means will then be described.

Each of the above-mentioned collimation elements 23a, 23b, 23a', 23b' is adapted to collimate, i.e. to make substantially parallel, the light beam exiting from the end of the optical fibre 21a, 21b, 21a', 21b' that is associated thereto. Conversely, this collimation element is also adapted to couple in this optical fibre a parallel light beam, incident on the collimation element parallelly to an optical axis of this collimation element.

Here, the collimation elements 23a, 23b, 23a', 23b' are each made by means of a graded index lens, having externally the shape of a cylinder, whose axis corresponds to the optical axis of the collimation element.

As a variant, the collimation elements could be each made by means of one or several spherical lenses, rather than by means of such a graded index lens.

Figure 4:
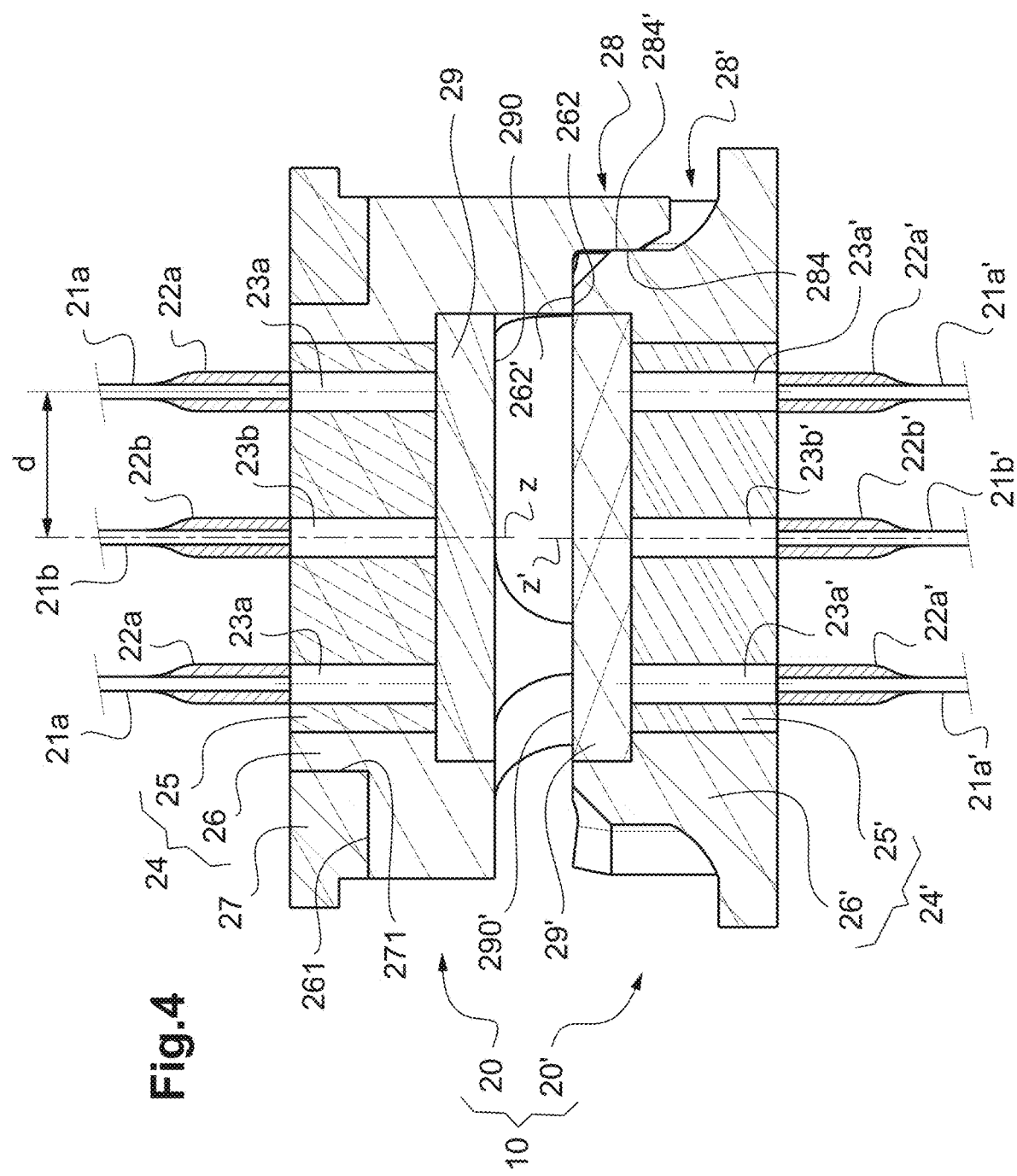
FIG. 4 is a cross-sectional view of the optical connection assembly of FIG. 1, along the sectional plane A-A shown in FIG. 3.

Here, the support 24 comprises a first holding part 25, for example made of resin or composite glue, which receives and holds the collimations elements 23a, 23b of the first optical connector 20 (FIG. 4).

Likewise, the base 24' comprises a second holding part 25', for example made of resin or composite glue, that receives and holds the collimations elements 23a', 23b' of the second optical connector 20'.

The ends of the optical fibres 21a, 21b of the first optical fibre assembly are located on a same side of the first holding part 25. Comparably, the ends of the optical fibres 21a', 21b' of the second optical fibre assembly are located on a same side of the second holding part 25'.

Each optical fibre 21a, 21b, 21a', 21b' is held in alignment with the corresponding collimation element 23a, 23b, 23a', 23b', here by means of an elastic sleeve 22a, 22b, 22a', 22b', for example made of elastomer, rubber or thermoplastic material.

The collimation elements 23a, 23b are arranged in the first holding part 25 so that their optical axes each extend parallel to the rotation axis z (and hence parallel to each other). The cylinders of the graded index lenses are hence each arranged with their axis parallel to the rotation axis z.

Likewise, each collimation element 23a', 23b' of the second optical connector 20' is arranged in the second holding part 25' with its optical axis parallel to the axis z'.

A first end of each of the graded index lenses levels with or comes out from the holding part 25, 25' that carries it, on the side on which the optical fibres 21a', 21b' are connected. A second, exit end of each of these graded index lenses comes out, or is at least optically accessible, from the other side of this holding part 25, 25'.

The second optical connector 20' comprises the same number of collimation elements as the first optical connector 20, i.e. here 13 collimation elements.

Figure 3:
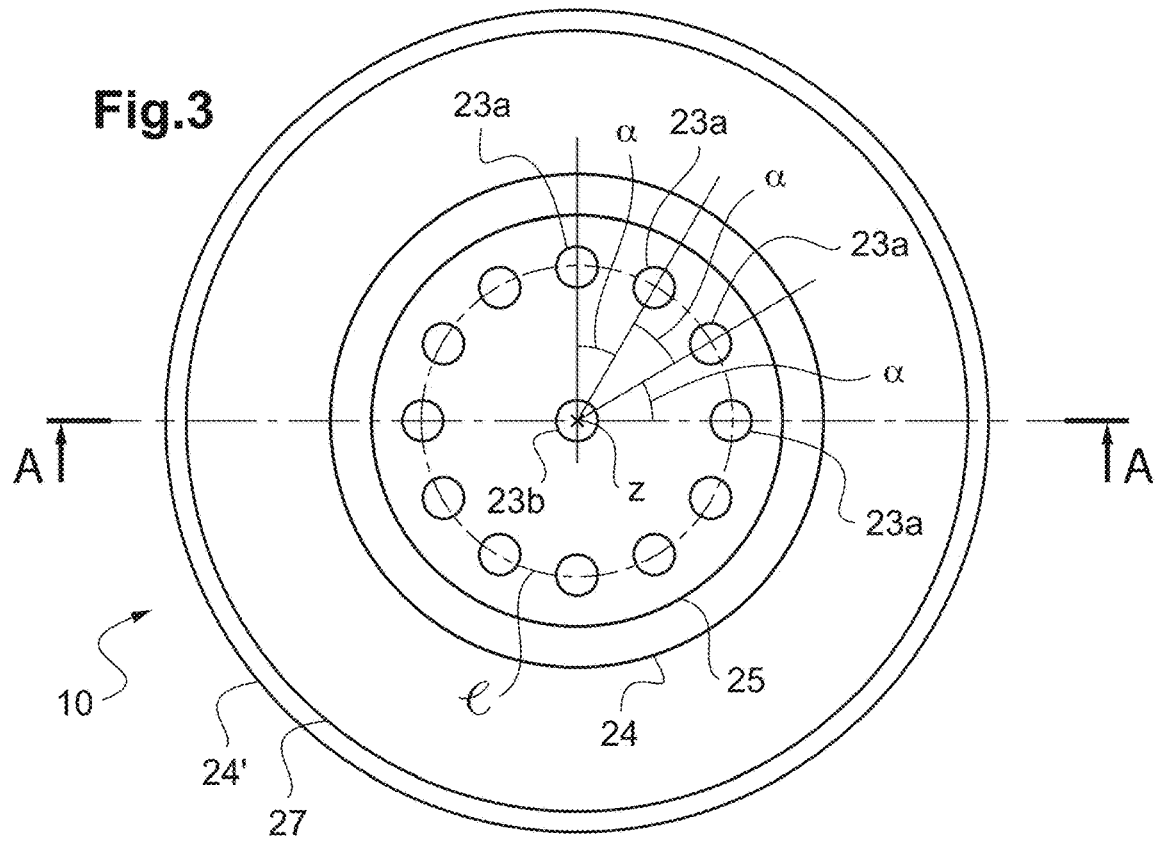
FIG. 3 is a top view of the optical connection assembly of FIG. 1.

The collimation elements 23a, 23b of the first optical connector 20 are arranged in the support 24 so as to form an assembly centred to this rotation axis z (FIGS. 3 and 4).

Comparably, the collimation elements 23a', 23b' of the second optical connector 20' are arranged in the base 24' so as to also form an assembly centred to the rotational symmetry axis z' of the second connector 20'.

The arrangement of the collimation elements 23a, 23b, 23a', 23b', with respect to the rotation axis z, and with respect to the axis z', respectively, will now be described in detail.

First, one of the collimation elements 23b of the first connector 20 is located at the rotation axis z, i.e. the optical axis of this central collimation element 23b coincides with the rotation axis z.

The other collimation elements 23a of the first connector are arranged in the support 24 (herein in the first holding part 25) so as to be equidistant from the rotation axis z, at a given distance d from this axis. These peripheral collimation elements 23a are hence distributed along a circle $\mathscr{C}$ centred to the rotation axis z. Here, they are regularly distributed along this circle: the angular spacing α that separates two nearby collimation elements, i.e. collimation elements that follow immediately each other along this circle, is constant, whatever the couple of collimation elements considered.

As shown in the Figures, the first optical connector 20 comprises 12 peripheral collimation elements 23a (in addition to the central collimation element 23b). The angular spacing α separating any two of the peripheral collimation elements 23a following immediately each other along the circle $\mathscr{C}$ is then equal to 360 degrees divided by 12 (i.e. 30 degrees).

The arrangement of the collimation elements 23a', 23b' of the second connector 20' of the base 24', with respect to the symmetry axis z', is identical to the arrangement of the collimation elements 23a, 23b of the first connector 20 with respect to the rotation axis z.

Hence, one of the collimation elements 23b', the central one, of the second optical connector 20', is arranged with its optical axis coinciding with the symmetry axis z' of this connector.

The other collimation elements 23a', the peripheral ones, of this connector, are arranged in the second holding part 25' so as to be equidistant from the axis z', at a distance from this axis equal to the distance d mentioned hereinabove.

Moreover, the peripheral collimation elements 23a' of the second optical connector 20' are also regularly distributed about the axis z', from an angular point of view. Any two of the peripheral collimation elements 23b' of the second optical connector 20', adjacent to each other, are hence angularly separated by the same angular spacing α as two adjacent peripheral collimation elements of the first optical connector 20.

From the point of view of its mechanical structure, the support 24 of the first optical connector 20 here comprises, in addition to the first holding part 25 and to the bearing 27, a first guiding part 26 integral with the first holding part 25 (FIGS. 4 and 5).

That is this first guiding part 26 of the support 24 that is here mounted for rotation in the bearing 27 to perform the above-mentioned rotational mounting.

This first guiding part 26 comprises a body 260 having generally the shape of a ring that encloses the first holding part 25. This body 260 has, on the first optical fibre assembly, a circular shoulder 261 intended to receive the bearing 27.

This bearing 27, for example made of polyamide, is made in the form of a ring engaged onto the first guiding part 26 in order, on the one hand, to come into abutment against the above-mentioned shoulder 261, and on the other hand, to guide the first guiding part 26 in rotation about the rotation axis z.

This rotation axis z corresponds to the axis of the cylindrical hole 271 that passes through the bearing 27 and into which said part 26 is engaged.

The support 24 has moreover at least one angular positioning member about the rotation axis z, herein several ones. As shown in the Figures, the support 24 has more precisely three such positioning members, formed in the first guiding part 26 (the positioning members and the first guiding part 26 are hence made single-piece).

Each of these positioning members is herein a finger 18 that protrudes from the body 260 of the guiding part 26, opposite the bearing 27, substantially parallelly to the axis z (FIGS. 4 and 5).

Each of these fingers 28 has, opposite to the body 260, a bevelled free end 280 (FIG. 5). The edge defined by this bevel is directed substantially radially with respect to the rotation axis z. Each of these fingers 28 has also two angular positioning faces 285, 286, each of these faces extending in a radial plane containing the rotation axis z, on either side of the finger, from the surfaces 281, 282 defining the bevel.

Each finger 28 moreover has, on the inner side of the part 26, i.e. on the side of the rotation axis z:
- at its free end 280, a guiding face 283 inclined towards the rotation axis z, and
- a centring face 284, ortho-radial with respect to the rotation axis z, these guiding 283 and centring 284 faces being adjacent to each other.

The positioning fingers 28 are equidistant from the rotation axis z. Hence, the centring faces 284 which these fingers are provided with form an assembly centred to the rotation axis z. Moreover, the fingers 28 are regularly distributed about this axis, from an angular point of view. Here, as they are three in number, they are positioned at 120 degrees with respect to each other.

The positioning fingers 28 occupy only a part of the circumference of the support 24, which is then laterally open.

The body 260 of first guiding part 26 has, at the base of each positioning finger 28, a planar bearing surface 262, perpendicular to the rotation axis z, and hence perpendicular to the direction of extension of the finger 28.

The base 24' of the second connector 20' here comprises a second guiding part 26', integral with the second holding part 25' (FIG. 4), and conformed to cooperate with the first guiding part 26 so as to guide the first and second optical connectors 20, 20' with respect to each other during their fitting together.

That is by this second guiding part 26' that the second optical connector 20' is fastened to the base 3' of the underwater connection system 1.

This second guiding part 26' has generally the shape of a ring of axis z' that encloses the second holding part 25' (FIGS. 4 and 6).

The base 24' has moreover at least a shape 28' adapted to cooperate with one of the angular positioning members of the support 24, so that the support 24 and the base 24' take, with respect to each other, said given angular position (for which the collimation elements of the first optical connector are located opposite those of the second optical connector).

Each of these shapes, which constitutes a female positioning member, is here a recess 28' designed to receive one of the positioning fingers 28 (FIG. 4). This recess 28' is performed at the periphery of the second guiding part 26'. The female positioning members 28', and the second guiding part 26', hence constitute a same, single-piece, mechanical part.

The number of recesses 28' formed in the second guiding part 26' is here equal to the number of peripheral collimation elements 23a' of the second optical connector 20' (here equal to 12).

These recesses 28' are equidistant from the axis z', and regularly distributed about the latter, from an angular point of view. Two adjacent recesses 28' are hence separated from each other by the same angular spacing α, here equal to 30 degrees, whatever the couple of adjacent recesses 28' considered (FIG. 6).

Each recess 28' comprises a centring and positioning portion, and a guiding portion 280' (FIG. 6).

The centring and positioning portion has a shape complementary of that of any one of the positioning fingers 28. This portion comprises in particular:
  two angular positioning faces 285', 286', each of these faces extending in a radial plane containing the axis z', on either side of the recess 28', and
  a centring face 284', which extends ortho-radially with respect to the axis z' and that is directed towards the outside of the second guiding part 26' (at the opposite of axis z').

The centring faces 284' of the different recesses 28' are hence arranged as if they were distributed over a cylindrical surface centred to the symmetry axis z' of the second optical connector 20'.

The guiding portion 280' has a flared surface, like a funnel whose narrowest end is connected to the centring and positioning portion of the considered recess 28'. Herein, the narrowest end of the guiding portion 280' is hence connected to the angular positioning faces 285', 286' and to the centring face 284'. The widest end of the guiding portion 280' corresponds to the opening of the recess 28'.

The guiding portion 280' is connected, at its widest end (at the opposite the angular positioning 285', 286' and centring 284' faces), to a planar bearing face 262' perpendicular to the axis z'.

Moreover, the guiding portions 280' of two adjacent recesses 28' are adjacent to each other: they connect to each other at an edge, substantially radial with respect to the axis z'.

The collimation elements 23a, 23b of the first optical connector 20 are protected by the first protection window 29 of this connector. Likewise, the collimation elements 23a', 23b' of the second optical connector 20' are protected by the second protection window 29' which the second optical connector is provided with (FIG. 4).

The first protection window 29, just as the second one 29', covers more precisely the exit ends of the collimation elements 23a, 23b, 23a', 23b' of the corresponding optical connector 20, 20', at the opposite of the ends of the optical fibres 21a, 21b, 21a', 21b' connected to this connector.

Each of these protection windows 29, 29', made for example of sapphire, is transparent and has a high resistance to scratches. It has, opposite to the collimation elements 23a, 23b, 23a', 23b' it protects, a planar external face 290, 290'.

Each of the first and second protection windows 29, 29' is fastened to the first guiding part 26 and to the second guiding part, respectively, in a sealed manner. Hence, a liquid located on the side of the external face 290, 290' of one of these protection windows cannot pass through the corresponding optical connector 20, 20' to arrive on the side of the optical fibres 21a, 21b, 21a', 21b'.

Figure 2:
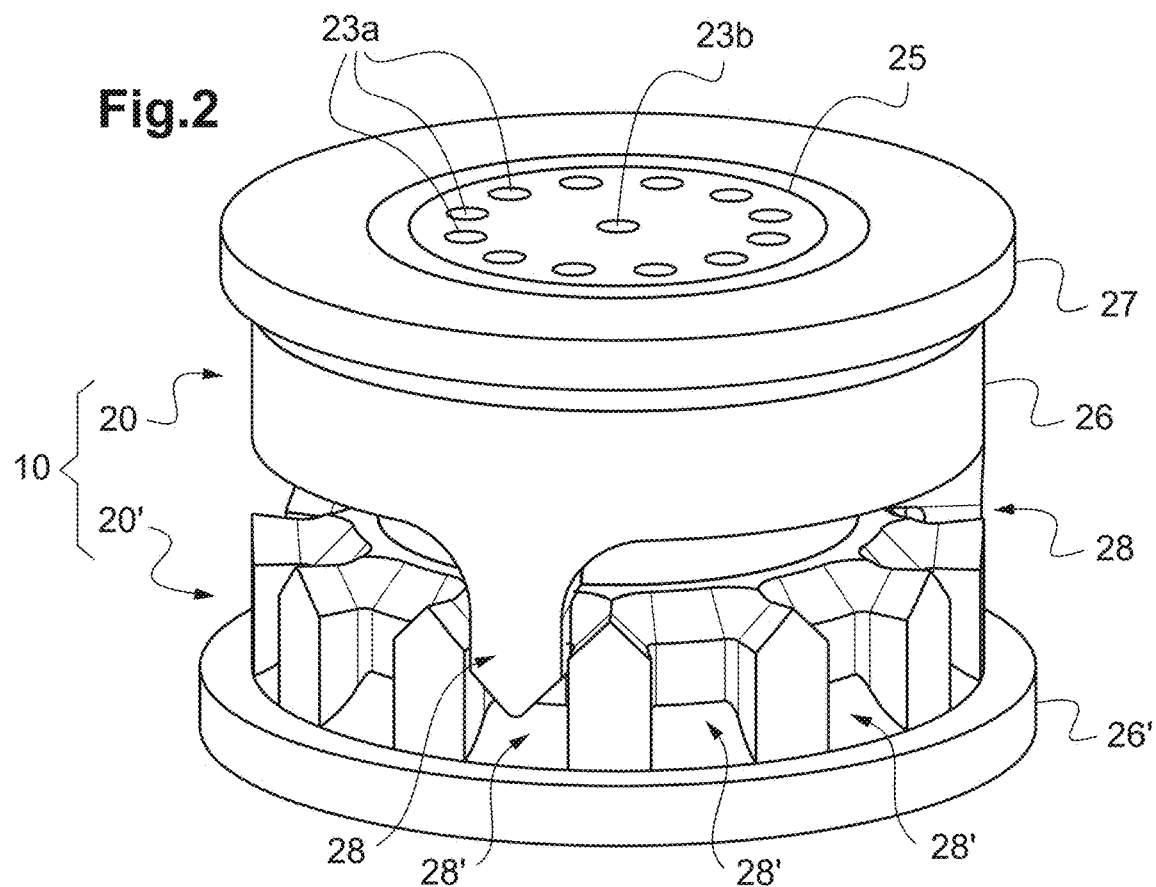

Once the first and second optical connectors 20, 20' fitted together (herein by assembly of the first connection element 2 and of the second connection element 2'), each positioning finger 28 is engaged in one of the recesses 28' of the base 24' (FIG. 2).

In this configuration, the centring face 284 of each of these fingers bears against the centring face 284' of the corresponding recess. Given that the positioning fingers 28 are herein at least three in number, that all the centring faces 284' of the base 24' are centred to the axis z', and that all the centring faces 284 of the support 24 are centred to the rotation axis z, this imposes the support 24 to be coaxial with the base 24', i.e. to be positioned with its rotation axis z coinciding with the symmetry axis z' of the base 24'.

Moreover, the two angular positioning faces 285', 286' of the considered recess 28', which are then in contact with the two angular positioning faces 285, 286 of this finger 28, impose the support 24 to be in the above-mentioned given angular position.

This given angular position is one of the coupling angular positions, for which each collimation element 23a, 23b of the first optical connector 20 is located facing, i.e. in alignment with, one of the collimation elements 23a', 23b' of the second optical connector 20', as shown in FIG. 4.

In such an angular position, a light beam coming from one of the optical fibres 21a, 21b, 21a', 21b':
  exits from the collimation element associated with this optical fibre, substantially parallel, centred to the optical axis of this collimation element and parallelly to this axis,
  passes through the two protection windows 29 and 29',
  then enters the collimation element located facing the preceding one, herein by being parallel to the optical axis of the latter collimation element, and by being centred to its axis, so that this light beam is then coupled (on the other side of the optical connection assembly 10) in the optical fibre connected to this latter collimation element.

The optical connection assembly 10 here has several such coupling angular positions (angular positions of the support with respect to the base). Here, any two nearby coupling angular positions are separated by a same angle, here equal to the angular spacing α between peripheral collimation elements. The fact that the optical connection assembly 10 has several coupling angular positions here results from the fact that:
  the peripheral collimation elements 23a, 23a' are regularly distributed from an angular point of view, and identically, in the support 24, and in the base 24', the number n of peripheral collimation elements present in each optical connector (herein, n=12) is a multiple of the number of angular positioning members 28 of the support 24 (here, equal to 3), and that the number n of peripheral collimation elements present in each optical connector is a multiple of the number of angular positioning members 28' of the base 24'.

Here, the number of female angular positioning members 28' of the base 24' (equal to 12) is higher than the number of male positioning members 28 of the support 24.

The number n of peripheral collimation elements present in each optical connector 20, 20' is higher than or equal to, here equal to, the number of different coupling angular positions of the optical connection assembly 10.

The optical fibres 21a, 21b of the first optical fibre assembly, just like those 21a', 21b' of the second optical fibre assembly, are here undifferentiated, i.e. they are of the same model, and hence have identical, or at least close, optical properties.

Given that these optical fibres are undifferentiated, any one of the coupling angular positions suits to optically couple each optical fibre 21a, 21b of the first assembly to one of the optical fibres 21a', 21b' of the second assembly.

Once this coupling made, it is possible to determine, for example by means of optical transmission tests, which one of the optical fibres of the first assembly has finally been connected to a given one of the optical fibres of the second assembly. An allocation and addressing procedure can then be implemented in order to selectively transmit to a determined one of the optical fibres of the second optical fibre assembly, a light signal, emitted from a zone that is remote from the optical connection assembly.

The fact that several different angular positions suit that way, to couple the optical fibres of the first assembly to those of the second assembly, offers a great freedom in the angular positioning of the first and second optical connectors with respect to each other. This positioning freedom is particularly appreciable in the context of difficult access and operation which the optical connection assembly 10 is intended for.

When the first and second optical connectors 20, 20' are fitted together, the bearing surface 262 of the support 24 comes into abutment against the bearing face 262' of the base 24'. The two bearing faces 262 and 262' hence cooperate with each other to fix the relative position of the support 24 with respect to the base 24' along the axis z'.

In this position, the outer faces 290 and 290' of the two protection windows 29, 29' are located remote from each other (FIG. 4).

This arrangement, combined to the fact that the support 24 is laterally open, allows evacuating a liquid, such as sea water, present before the fitting between the first and second optical connectors 20, 20'. This also allows subsequently injecting a liquid, which is a cleaning or a filling liquid, between these connectors, which is particularly interesting when, as here, the optical connection assembly 10 equips an underwater connection system.

When the two optical connectors 20, 20' are progressively moved closer to each other, with their respective protection windows 19, 19' facing each other, the free end 280 of each positioning finger 28 progressively engages into the guiding portion 280 of one of the recesses 28 of the second optical connector 20'.

The guiding face 283 of the finger, inclined towards the rotation axis z, then cooperates with the guiding portion 280 of the recess 28, having a flared shape, to progressively guide the support 24 towards the coaxial configuration presented hereinabove.

Moreover, when the two optical connectors 20, 20' are hence moved closer to each other, due to the fact that the bevelled shape of the free end 280 of the finger 28, and of the flared shape of the guiding portion 280', the support 24 turns progressively in the bearing 27, about the rotation axis z, to finally take one of the coupling angular positions.

Hence, the recesses 28' are distributed over the whole circumference of the base 24', with their openings being adjacent to each other. In other words, two nearby openings touch each other, by being separated only by an edge. Any initial angular position of the support 24 hence finally leads, after the first and second optical connectors 20, 20' have been fit together, to one of the above-mentioned coupling angular positions.

Hence, thanks to their structures, the first and second optical conductors 20, 20' are self-aligning and self-indexing, from an angular point of view. Their structures moreover provide a great tolerance on the relative positions of these connectors before the beginning of the fitting, while ensuring an accurate final positioning.

To optically couple the first optical fibre assembly 21a, 21b to the second optical fibre assembly 21a', 21b', it is hence just necessary to move the first and second optical connectors 20, 20' closer to each other, opposite to each other, without requiring for that purpose the use of complex, controllable positioning systems with several degrees of freedom.

This optical connection can hence be established in a fast, easy and reliable manner, which is particularly appreciable in an environment of difficult access, as for example during works in height, in mountain or very windy zones, or also, as here, under water, in presence of strong sea currents.

As a variant, the optical connection assembly 10 could comprise a number of collimation elements, positioning fingers and/or recesses different from what has been presented hereinabove. For example, the first, just as the second optical connector could comprise 9 peripheral collimation elements, instead of 12, the support then comprising 3 fingers, and the base comprising 9 recesses, or potentially 3 recesses.

It could also be provided that the support comprises a single positioning finger, and that the base comprises a single corresponding recess, which is enough so that, once fitted, the support is placed in said given angular position with respect to the base. This latter embodiment however requires a more accurate positioning of the first optical connector and the second optical connector, with respect to each other, previously to their fitting together, than in the embodiment described hereinabove with reference to the Figures (this initial positioning being intended to bring the single positioning finger into an initial angular position close to that of the single recess intended to receive it).

As another variant, instead of the support being provided with the positioning fingers, and the base with the corresponding recesses, it could be provided that the base is provided with these fingers, and the recesses are then made in the support.

Moreover, the support and the base are here each formed of two parts (the holding part of the collimation elements, and the guiding part). As a variant, it could however be provided that the support and/or the base are each formed single-piece (integral), or, on the contrary, comprise intermediate parts, in addition to the holding 25, 25' and guiding 26, 26' parts.

In a variant of the underwater connection system that has been described hereinabove, it could be provided that the optical connector, which is provided with the rotating bearing, is fastened, by this bearing, to the base 3' rather that the cover 3.

Moreover, in another embodiment of the underwater connection system, the electrical connection elements, in particular the above-mentioned electrical tracks, could be omitted.

The invention claimed is:

1. An optical connector comprising a plurality of collimation elements associated with a plurality of optical fibres, respectively, and carried by a support,
   wherein the support is mounted for rotation in a bearing about a rotation axis, in that the collimation elements are arranged in the support so as to be equidistant from this rotation axis, and in that the support has angular positioning members for fixing the angular position of the support about said rotation axis.

2. The optical connector according to claim 1, further comprising an additional collimation element located at the rotation axis.

3. The optical connector according to claim 1, wherein at least one of the angular positioning members is a finger protruding from said support.

4. The optical connector according to claim 3, wherein the support has a plurality of positioning fingers.

5. The optical connector according to claim 3, wherein the free end of the finger is bevelled.

6. The optical connector according to claim 1, wherein said support has a planar surface from which extends one at least of the angular positioning members, this surface being perpendicular to the direction of extension of said positioning member.

7. The optical connection assembly comprising a first optical connector according to claim 1, and a second optical connector comprising a base carrying optical elements and having complementary angular positioning members, each adapted to cooperate with one of the angular positioning members of the first optical connector to fix the relative angular position of the support with respect to the base.

8. The optical connection assembly according to claim 7, wherein the angular positioning members of the first optical connector, or the complementary angular positioning members of the second optical connector, are made in the form of recesses comprising a guiding portion flared on the side of the recess opening, the openings of said recesses being adjacent to each other.

9. The optical connection assembly according to claim 7, wherein the optical elements, of the second optical connector are collimation elements, and wherein said angular position of the support with respect to the base, fixed by said positioning members, is a coupling angular position for which a part at least of the collimation elements of the first optical connector is located facing collimation elements of the second optical connector.

10. The optical connection assembly according to claim 9, having several distinct coupling angular positions, wherein the angular positioning members and the complementary angular positioning members are then arranged so as to fix the relative angular position of the support with respect to the base, indifferently in either one of said coupling angular positions, each coupling angular position being such that, in this position, a part at least of the collimation elements of the first optical connector is located facing collimation elements of the second optical connector.

11. The optical connection assembly according to claim 9, wherein the number of collimation elements of the first optical connector that are equidistant from the rotation axis is a multiple of the number of coupling angular positions of the optical connection assembly.

12. The optical connection assembly according to claim 7, wherein for the first optical connector, the at least one of the angular positioning members is a finger protruding from said support, and wherein at least one of said complementary angular positioning members is a recess designed to receive said finger.

13. The optical connection assembly according to claim 7, wherein for the first optical connector, said support has a planar surface (262) from which extends one at least of the angular positioning members (28), this surface (262) being perpendicular to the direction of extension of said positioning member, and wherein the base comprises a planar face designed to cooperate with said surface perpendicular to the extension of the angular positioning member.

14. An electrical connector comprising a cover, at least one electrically conductive track and an optical connector according to claim 1, wherein the bearing is integral with the cover and wherein the electrically conductive track surrounds said rotation axis.

15. A connection system comprising:
   a first electrical connector, according to claim 14, and
   a second electrical connector comprising a base, at least another electrically conductive track and another optical connector that comprises a base carrying optical elements and that has complementary angular positioning members, each adapted to cooperate with one of the angular positioning members of the optical connector of the first electrical connector to fix the relative angular position of the support with respect to the base.

* * * * *